United States Patent [19]
Williams

[11] 4,178,747
[45] Dec. 18, 1979

[54] ROTARY EDGE CUTTER

[76] Inventor: Stanley H. Williams, 52 Princes Hwy., Sylvania, New South Wales, Australia, 2224

[21] Appl. No.: 883,976

[22] Filed: Mar. 6, 1978

[30] Foreign Application Priority Data

Mar. 11, 1977 [AU] Australia .................................. 9366

[51] Int. Cl.² .......................................... A01G 3/06
[52] U.S. Cl. ....................................... 56/256; 30/240
[58] Field of Search ................ 56/256; 30/240, 205; 172/15, 17

[56] References Cited

U.S. PATENT DOCUMENTS

| | | | |
|---|---|---|---|
| 2,212,057 | 8/1940 | Waller | 30/240 |
| 2,499,070 | 2/1950 | Ledbetter | 56/256 |
| 2,525,944 | 10/1950 | Ralston | 56/256 |
| 3,472,007 | 10/1969 | Green | 56/256 |

*Primary Examiner*—Jay N. Eskovitz
*Attorney, Agent, or Firm*—Beveridge, DeGrandi, Kline & Lunsford

[57] ABSTRACT

A herbage trimmer has a larger, toothed rotatable cutting blade provided with a circular array of bosses. A smaller, toothed rotatable cutting blade lies flat against the larger blade and is positioned within the tooth tip circle of the larger blade so that some of its teeth overlap with some of the teeth of the larger blade. The bosses on the larger blade are in gear-tooth relationship with the teeth of the smaller blade so that the blades counter-rotate to produce a continuous shearing action between the over-lapping teeth of the blades.

2 Claims, 6 Drawing Figures

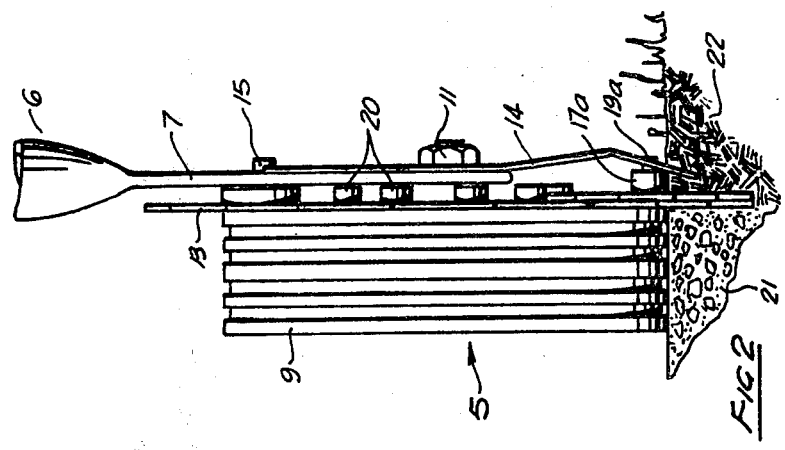
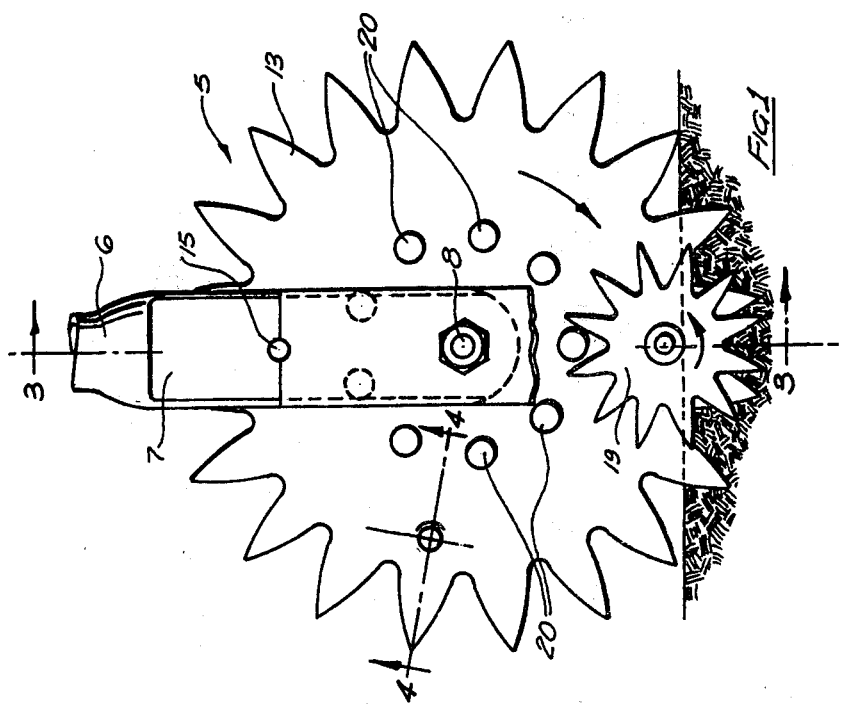

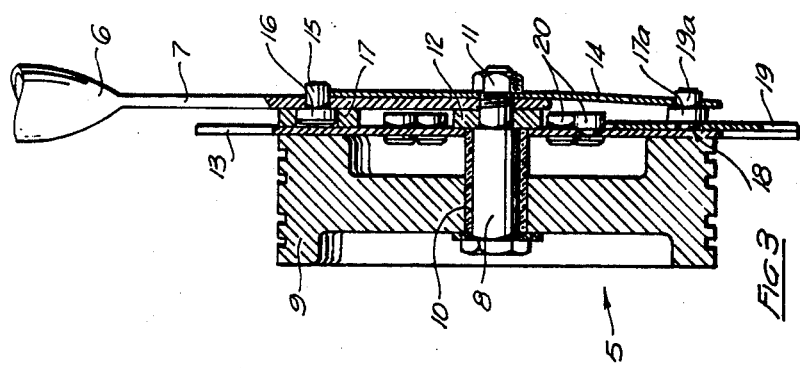
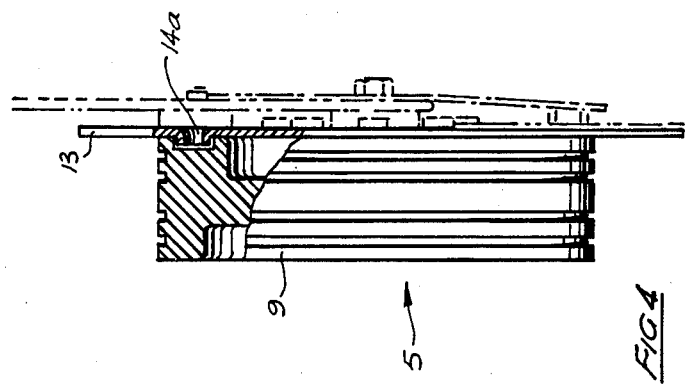

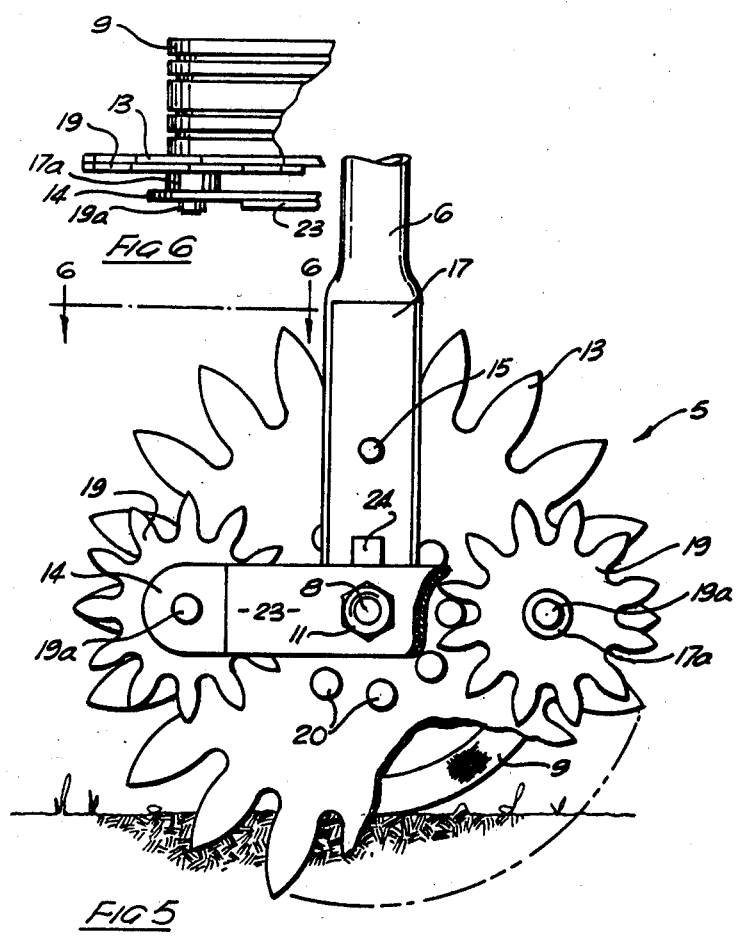

ROTARY EDGE CUTTER

This invention relates to herbage trimmers of the kind used, usually in the garden, for shaping hedges, pruning or trimming shrubs and, in hand-powered versions trimming the edges of lawns furnished with an edging strip.

In the case of prior-known trimmers of the powered kind they have conventionally comprised a pair of scissor blades or a pair of multi-toothed blades which oscillate to and fro to produce a shearing action. Such powered trimmers are usually driven by an electric motor and necessarily include fairly elaborate devices for converting the rotary motion of the electric motor into the vibratory or oscillatory motion of the cutting blades.

In the case of prior-known lawn-edge trimmers those including a star-wheel type rotary-cutting blade have usually relied upon the teeth of that blade rotating as the trimmer is rolled along a lawn-edging strip to cause a shearing action between the teeth of the blade and the edging strip. Lawn edging strips are usually of concrete, frequently cast in situ, and thus are relatively roughly surfaced. Therefore, they are far from ideal as a fixed element for co-operation with the blade to produce a shearing cutting action.

In view of the foregoing an object of the present invention is to provide a herbage trimmer of the kind which provides a true shearing action between two rotary multi-toothed cutting blades of a particularly simple construction adapted to be used in both powered type trimmers and hand-driven lawn-edge trimmers.

The invention consists in a herbage trimmer comprising a larger, toothed rotatable cutting blade, a smaller, toothed rotatable cutting blade lying flatly against the first blade and positioned such that some of its teeth overlap with some of the teeth of the larger blade and drive transmission means causing clock-wise rotation of the smaller blade in consequence of counter clock-wise rotation of the larger blade to effect a continuous shearing action between those teeth of the two blades overlapping for the time being.

For preference the drive transmission means comprise a ring of bosses or protuberances on the larger blade adapted to function in the manner of gear teeth mating with the cutting teeth of the smaller blade, in particular with those of the teeth of the smaller blade which for the time being are not overlapping teeth of the larger blade.

For preference also two smaller cutting blades are employed. Each is similarly positioned with respect to the larger blade, and similarly adapted for rotation and drive transmission but preferably the smaller cutting blades lie against opposite halves of the larger blade one on either side of that diameter of the larger blade which is a projection of the axis of the handle of the herbage trimmer.

By way of example, several embodiments of the invention are described hereinafter with reference to the accompanying drawings.

FIG. 1 is a side elevation of the cutting head of a manually propelled lawn-edge trimmer according to the invention.

FIG. 2 is a side elevation of the cutting head of FIG. 1.

FIG. 3 is a sectional view taken on line 3—3 of FIG. 1.

FIG. 4 is a view similar to FIG. 2 but showing a scrap section taken on line 4—4 of FIG. 1.

FIG. 5 is a view similar to FIG. 1 showing a second embodiment of the invention.

FIG. 6 is a plan view taken on line 6—6 of FIG. 5.

The lawn-edge trimmer illustrated by FIGS. 1 to 4 comprises a cutting head 5 mounted at the bottom end of an elongate handle of which only the bottom end 6 appears in the drawings. The top end of the handle may be furnished with a conventional hand grip to enable the user of the trimmer to walk along gripping the handle and pushing the trimmer in front of him with the cutting head in contact with the ground slightly ahead of him as will be described in more detail hereinafter.

The handle end 6 terminates in a mounting strap 7 carrying a stub axle 8 for a rubber or other elastomeric wheel or rubber tyred wheel 9. Wheel 9 is freely rotatable on the stub axle 8 and the frictional wear between the two may be minimised by means of an anti-friction bush 10 upon the stub axle.

The stub axle is secured in position by virtue of a clamping nut 11 threaded upon a smaller diameter end portion of the axle 8 which when tightened up causes the circumferential shoulder between that end portion and the main body of the axle 8 to come into clamping engagement with a spacer 12 sleeved upon the smaller diameter portion of the axle 8 and disposed between said shoulder and the strap 7.

A larger toothed rotary-cutting blade 13 is also rotatable upon the bush 10 and is constrained to rotate as one with the wheel 9 by virtue of an inwardly-deformed hollow boss 14a on the blade or formed from the material of the blade 13 and extending into a relatively neat fitting recess in one face of the wheel 9.

A leaf-spring 14 is also clamped to the strap 7 by the clamping nut 11 and is maintained in longitudinal alignment with the strap 7 by virtue of a recess in one end of the spring 14 embracing or partly embracing a boss 15 extending from a button 16 encircled by an annular spacer 17. The lower end of the leaf-spring 14 bears against a second button 17a from which projects a very short axle stub 18 on which is mounted a smaller multi-toothed star-wheel type cutter blade 19. The button 17a and thus the axle stub 18 thereon is held in position by virtue of a further boss 19a extending from the button through a clearance hole in the leaf-spring 14. A ring of bosses 20 concentric with axle 8 project from the larger cutter blade 13. Bosses 20 project for a distance which is slightly less than the thickness of the spacers 12 and 17 and thus there is clearance between the bosses 20 and the strap 7.

The bosses 20 are spaced apart and positioned such that they may co-act with the teeth of the smaller cutter blade 19 to cause rotation of that blade upon rotation of the larger blade 13.

It will be apparent to those skilled in the art that the direction of the rotation of the two cutter blades will be opposed so that those of their teeth, namely the lowermost few teeth on each, which overlap at any given time move in contrary directions and thus provide a true shearing action between the teeth of each blade.

Rotation of the larger cutter blade 13 is effected by rotation of the wheel 9 as the trimmer is pushed along with the rim or tyre of the wheel 9 in contact with a lawn edging strip and the lawn edge is then trimmed by the shearing action of the overlapping teeth of the two cutter blades. The situation is clearly illustrated in FIG. 2 wherein 21 represents an edging strip and 22 the margin of a lawn to be trimmed.

Many of the components shown in the FIG. 5 and FIG. 6 embodiment of the invention are assembled by exactly the same means and perform exactly the same function as corresponding components of the FIG. 1 embodiment of the invention and the reference numerals used in FIGS. 1 to 4 are again used in FIGS. 5 and 6 to identify the corresponding previously described components. In particular the arrangement of handle end 6, mounting strap 7 axle 8 wheel 9 and friction bush 10 clamping nut 11 spacer 12 larger tooth rotary cutting blade 13 inwardly deformed hollow boss 14a boss 15 button 16 annular spacer 17 and ring of bosses 20 is exactly the same as in the first embodiment.

In the FIGS. 5 and 6 embodiment the leaf-spring 14 is mounted at right angles to the longitudinal axis of the handle and is clamped against the strap 7 by a rigid brace 23, as may best be seen in FIG. 5 wherein one end portion of both components is shown as cut off. The leaf spring 14 and brace 23 are secured in position by projection of the threaded end of axle 8 through a clearance hold provided in each and are held in clamping engagement against strap 7 by means of clamping nut 11.

The brace 23 has substantially the same width in said longitudinal axis of said handle as the leaf spring 14.

A boss 24 of square cross-section protrudes from strap 7. The boss 24 has sufficient thickness and is so positioned that one flat edge of the boss 24 abuts an edge of both the leaf-spring 14 and the brace 23 and thereby maintains the leaf spring 14 and brace 23 firmly at right angles to said longitudinal axis.

Each end of the leaf spring 14 bears against a button 17a having a very short axle stub 18 (not shown in FIGS. 5 and 6) on which is mounted a smaller multi-toothed star-wheel cutter blade 19. Each button 17a and thus each axle boss 18 thereon is held in position by a further boss 19a extending from each button through a clearance hole provided in the leaf spring 14. The clearance holes are located with centres equidistant from the axis of rotation of the larger balde 13 near each end of the leaf spring 14.

The brace 23 is shorter than the leaf spring 14 so as not to foul the axle bosses 19a when they rotate.

The two smaller multi-toothed star wheel blades 19 are of substantially the same diameter as each other with the axis of rotation of each at substantially the same distance from the axis of rotation of the larger blade 13 (part of which is shown as cut away in FIG. 6) so that the teeth of each smaller blade 19 may co-act with bosses 20 on the larger blade 13 to cause rotation of each smaller blade 19 upon rotation of the larger blade 13.

In use the lawn edge trimmer now being described is held to bring a region of the periphery of the larger blade in which there is overlap with teeth of one of the smaller blades into overlap with the edging strip and is pushed along with the rim or tyre of the wheel 9 in contact with the top of the edging strip as described in respect of the FIG. 1 embodiment.

Rotation of wheel 9 in contact with the strip effects rotation of the larger cutting blade 13 and consequential rotation of both smaller cutting blades 19. The lawn edge is then trimmed by the shearing action of the overlapping teeth of the larger blade with that smaller blade which is adjacent to the ground as previously described.

One of the two smaller cutting blades may be used to trim lawns edged by an edging strip to the right and, by rotating the lawn edge cutter about the longitudinal axis of the handle through 180°, the other smaller cutting blade may be used to trim lawns edged by an edging strip to the left.

In other embodiments of the invention adapted for use as a hedge cutter or shaper or the like the cutting blade arrangements may be substantially as illustrated in the manually-operably lawn-edge trimmers illustrated in the drawing but with the larger blade mounted directly or by way of a gear reduction drive to the output shaft of an electric motor of sufficient lightness to be held in the hand and manipulated. Usually of course the non-overlapping portions of the toothed periphery of the cutter blades would be shrouded by a shroud secured to the motor frame and the motor itself would be provided with handle pieces to facilitate manipulation of the trimmer as a whole.

In still other embodiments of the invention the drive connection may take forms other than direct interaction between a plurality of protuberances on the larger blade and the cutting teeth of the smaller blade. For example, a ring gear may be secured to the face of the longer blade having its teeth meshing with a pinion gear secured to the smaller blade. In such event the driving speeds of the larger and smaller blades may be varied by appropriate choice of gear ratios and the wear occasioned to the cutting teeth of the smaller blade by the more direct arrangement illustrated in the drawings is obviated.

It will be apparent to those skilled in the art that the angle between the longitudinal axis of the handle and the line joining the axis of a smaller cutting blade to the axis of the larger cutting blade may be varied and means may be provided whereby such angle is made variable or, in the case of two or more smaller cutting blades, independently variable.

I claim:

1. A herbage trimmer comprising a larger, toothed rotatable cutting blade, a smaller, toothed rotatable cutting blade lying flatly against the larger blade and positioned within the tooth tip circle of the larger blade such that some of its teeth overlap with some of the teeth of the larger blade, a plurality of bosses on said larger blade disposed in circular array concentric with said larger blade and in gear-tooth relationship with the teeth of the smaller blade such that counter clock-wise rotation of the larger blade effects clockwise rotation of the smaller blade, thereby producing a continuous shearing action between those teeth of the two blades overlapping for the time being.

2. A herbage trimmer according to claim 1 for trimming lawn edges, said trimmer having a wheel secured to the larger blade to rotate said larger blade in response to movement of the trimmer with said wheel in contact with a lawn edge strip.

* * * * *